Patented July 19, 1932

1,868,202

UNITED STATES PATENT OFFICE

PAUL GROSSMANN, OF BASEL, SWITZERLAND, ASSIGNOR TO SOCIETY OF CHEMICAL INDUSTRY IN BASLE, OF BASEL, SWITZERLAND

PROCESS OF MAKING CONDENSATION PRODUCTS OF THE ANTHRAQUINONE SERIES AND NEW PRODUCTS OF THIS CLASS

No Drawing. Application filed December 20, 1929, Serial No. 415,601, and in Switzerland December 22, 1928.

The present invention relates to the manufacture of condensation products of the anthraquinone series, of which a great number are new and which are particularly valuable as dyestuffs or as intermediate products for the manufacture of dyestuffs. It comprises the process of making these new products, the new products themselves, and the material that has been dyed with the new products.

It has been found that the leuco-derivatives of the hydroxyanthraquinones of the general formula

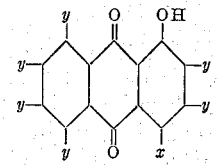

wherein $x$ stands for OH or NHR (R=H or alkyl), and $y$ stands for H or a group of substituents consisting of $SO_3H$, halogen, OR or NHR, R meaning H or alkyl, are capable of exchanging the OH-groups for NH-aryl groups, by heating them in aqueous solution or suspension with boric acids and primary aromatic amines.

Instead of the leuco-derivatives the anthraquinone compounds themselves may be used if the operation is conducted in presence of a reducing agent. The reaction occurs very easily, for instance even at the temperature of the water-bath. That such a condensation should begin and smoothly proceed under such mild conditions could not be foreseen by study of the literature. The reaction may also be conducted with complete or partial elimination during the condensation of any sulfonic acid groups that may be present.

The products thus obtained, which correspond with the general formula

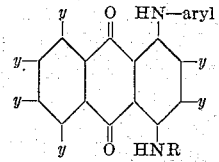

wherein R stands for H, alkyl or aryl, in which further the aryl nuclei may be substituted at will, and $y$ stands for any substituents, may be used as acid dyestuffs for animal fibres or artificial fibres, such as acetate silk. Or in the event of the products being non-sulfonated for resins, varnishes or colloids of the cellulose series, for instance nitro-cellulose varnish or acetate silk. In the latter case it is advantageous to bring the products into a state of fine subdivision, for example by grinding in presence of sulfite cellulose liquor or with a sulfonated residue of the benzaldehyde manufacture or the like.

Particularly valuable are the new products obtainable according to the present invention which correspond with the general formula

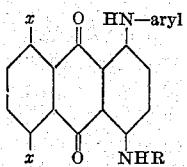

wherein the aryl nucleus may carry any substituents, such for example as

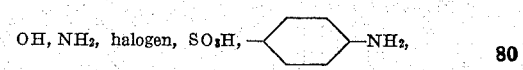

etc., and wherein one $x$ stands for OH and the other $x$ for NHR (R=H or alkyl), and wherein three of the $\beta$-positions are occupied by hydrogen atoms and one of the $\beta$-positions is occupied by a sulfonic group or by an hydrogen atom.

These new products form violet-black to blue-black powders, which dissolve in alcohol to blue to green-blue solutions, yielding on acetate silk blue to green-blue tints or prints, respectively. In concentrated sulfuric acid they dissolve to yellow to yellow-green solutions which turn to violet to blue-green when boric acid is added.

The products are also useful as intermediate products for the manufacture of other dyestuffs.

The following examples illustrate the invention, the parts being by weight:—

Example 1

3.6 parts of 1-hydroxy-4-aminoanthraquinone-5-sulfonic acid (sodium salt) are introduced into 70 parts of water together with 15 parts of para-aminophenol, 3 parts of boric acid and 2.3 parts of sodium hydrosulfite; and the whole is heated at 40° C., and mixed with 3 parts of glacial acetic acid. Heating to 90–95° C., for 1 hour follows, whereby the condensation of the leuco-derivative without oxidation is completed. Sodium carbonate is now added until the reaction is alkaline and the mass is warmed for some time longer while air is passed through it, during which operation the original yellowish color passes to green by oxidation of the product to an anthraquinone derivative. Elimination of the sulfo-group does not occur. The liquid is now filtered cold and the solid matter washed with dilute hydrochloric acid to remove para-aminophenol and then further washed with dilute common salt solution. The product, which probably has summarily been formed according to the following reaction

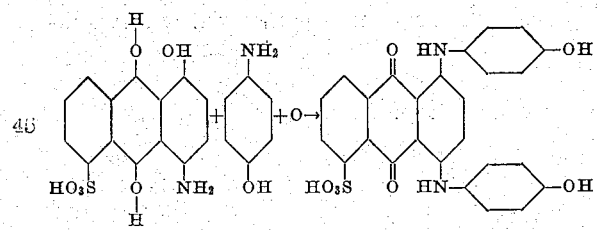

dissolves in water to a green solution which changes towards blue on addition of caustic soda solution, but on acidification becomes again green. The product dyes wool green tints.

Example 2

5.2 parts of para-diaminochrysazinedisulfonic acid (sodium salt) are introduced into 80 parts of water together with 15 parts of aniline, 6 parts of boric acid and 4.6 parts of sodium hydrosulfite, and the whole is heated to 40–50° C., and then mixed with 30 parts of glacial acetic acid. Heating to boiling for 1 hour follows, whereupon the liquid is filtered hot and the solid matter washed with hot water. The sodium salt of the sulfonic acid is salted out from the filtrate, filtered and washed with common salt solution. There are obtained about 1 part of a non-sulfonated product and about 2.3 parts of a product soluble in water, in which there is still only one sulfonic acid group. This product dyes wool green-blue tints.

The reaction has probably occurred according to the following summary equation:—

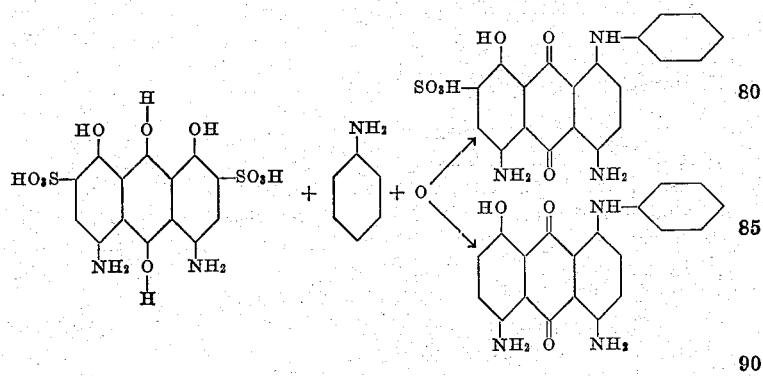

Example 3

A mixture of 5.2 parts of para-diaminochrysazine-disulfonic acid (sodium salt), 40 parts of water, 5 parts of aniline, 2 parts of boric acid and 4.6 parts of sodium hydrosulfite, is heated for 1½ hours to 95° C. The aniline is distilled with steam and the residual liquid is filtered hot and the solid matter washed and dried. There are obtained about 2.9 parts of a non-sulfonated condensation product, which, when precipitated from the sulfuric acid solution, dyes acetate silk blue tints. This product dissolves in alcohol to a violet solution, which is changed to blue-green by addition of some caustic soda solution. The reaction proceeds similarly with para-diaminochrysazinedisulfonic acid and para-aminophenol; with para-diaminochrysazinedisulfonic acid and para-toluidine; with para-diaminoanthrarufinedisulfonic acid and aniline; with para-diaminoanthrarufinedisulfonic acid and para-aminophenol; with para-dimethyldiaminoanthrarufinedisulfonic acid and aniline, among others.

The product from para-diaminochrysazinedisulfonic acid and para-aminophenol dissolves in alcohol to green-blue solutions, in concentrated sulfuric acid to green-yellow solutions, in concentrated sulfuric acid with addition of boric acid to dirty violet-blue solutions, and dyes acetate silk green-blue tints. The product from para-diaminoanthrarufinedisulfonic acid and para-aminophenol behaves in a similar manner, but its solution in sulfuric acid plus boric acid is dark green-blue. The product from para-dimonomethylaminoanthrarufinedisulfonic acid and aniline dissolves in alcohol and in sulfuric acid plus boric acid to green-blue solutions and in concentrated sulfuric acid to yellow solutions. It dyes acetate silk green-blue. The substitution of para-aminophenol for the aniline in this latter dyestuff changes its color but little.

*Example 4*

5.2 parts of a mixture of para-diaminoanthrarufinedisulfonic acid and para-diaminochrysazinedisulfonic acid (sodium salt) are introduced as a paste into 40 parts of water (including the water of the paste), mixed with 5 parts of para-aminophenol, 1 part of crystallized boric acid and 4.6 parts of sodium hydrosulfite, and then heated to 50° C. To this mixture there is added 1 part of concentrated formic acid, and the whole is heated on the boiling water-bath, while stirring, until the product has become insoluble in water. The product is then filtered and washed hot and, after drying, there are obtained about 3.4 parts of a product which, when suitably made into a paste, dyes acetate silk green-blue tints.

*Example 5*

2.7 parts of finely subdivided 1:4:5:8-leuco-tetrahydroxyanthraquinone are heated in 70 parts of water with 3 parts of crystallized boric acid and 15 parts of para-aminophenol to the boil until a test portion, when boiled in an alcoholic caustic soda solution, dissolves to a green solution. The leuco-derivative which has separated is then filtered, washed with hot water and the residue remaining on the filter is boiled up in a dilute alcoholic caustic soda solution, in the presence of air, until it is fully oxidized. The alcohol is now distilled, and the solid matter is washed with water and dried. It has probably been formed according to the following summary reaction:—

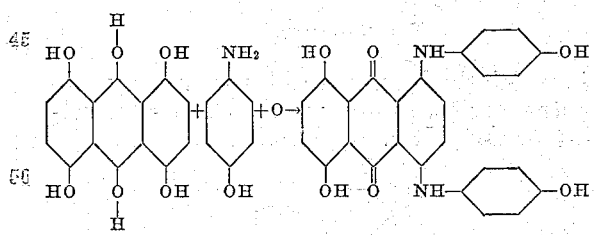

The product dissolves in organic solvents to green solutions. If it is sulfonated in the usual manner, it dyes wool green tints.

*Example 6*

2.7 parts of finely subdivided para-diaminochrysazine are heated with about 70 parts of water and 3 parts of sodium hydrosulfite at 40° C., and there are then added 5 parts of boric acid and 15 parts of aniline. The whole is then heated to boiling while carefully stirring and the boiling is continued until a test portion dissolves in alcohol and caustic soda solution to a green-blue solution, which remains green-blue after addition of acetic acid. To the whole quantity there are now added 150 parts of alcohol and 20 parts of caustic soda solution of 30 per cent. strength and the mixture is heated for about 2 hours in a reflux apparatus while air is passed through it, whereby the liquid assumes a green-blue color. The alcohol is now distilled and the residue filtered and the solid matter washed. This product dyes acetate silk greenish-blue tints.

Also in this case other products, such as para-aminophenol, may be substituted for the aniline.

*Example 7*

5.2 parts of 1:5-dihydroxy-4:8-diaminoanthraquinone-2:6-disulfonic acid (sodium salt), in the form of a paste, are heated with 50 parts of water, 3 parts of boric acid, 7.5 parts of β naphthylamine and 4.6 parts of sodium hydrosulfite to 50° C., and then mixed with 2 parts of concentrated formic acid. The whole is then carefully heated on the water-bath to the boil and stirred at about 95° C., for 1 to 2 hours, whereupon the whole is acidified with hydrochloric acid, filtered and the naphthylamine removed by washing with dilute hydrochloric acid. The whole quantity is now washed neutral with hot water and dried. In this manner there are obtained about 4 parts of a condensation product which dissolves in organic solvents to blue solutions.

In like manner the corresponding condensation product can be obtained with benzidine by using in the above reaction 7.5 parts of benzadine instead of the equal quantity of β-naphthylamine.

These products dissolve in alcohol to blue solutions, in concentrated sulfuric acid to yellow to green-yellow solutions, and in sulfuric acid with addition of boric acid to green-blue solutions.

What I claim is:—

1. Process for the production of condensation products of the anthraquinone series, consisting in heating the leuco-derivatives of hydroxyanthraquinones of the general formula

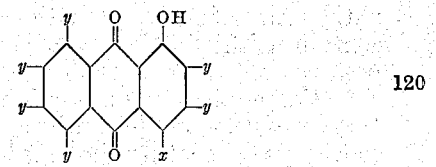

wherein $x$ stands for OH or NHR (R=H or alkyl) and $y$ stands for H or a group of substituents consisting of $SO_3H$, halogen, OR or NHR, R meaning H or alkyl, with such primary aromatic amines which contain neither sulfo nor carboxyl groups in presence of water and boric acid.

2. Process for the production of condensation products of the anthraquinone series, consisting in heating the leuco-derivatives of hydroxyanthraquinones of the general formula

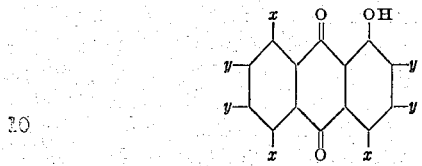

wherein $x$ stands for OH or NHR (R=H or alkyl), and wherein in every pair of the ortho-standing $y$'s one $y$ stands for an $SO_3H$-group and the other for an hydrogen atom, with such primary aromatic amines which contain neither sulfo nor carboxyl groups in presence of water and boric acid.

3. Process for the production of condensation products of the anthraquinone series, consisting in heating the leuco-derivatives of hydroxyanthraquinones of the general formula

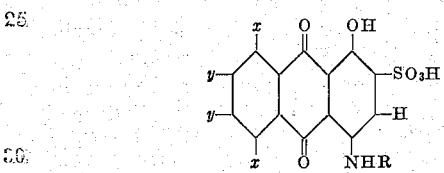

wherein one of the $x$ stands for OH and the other for NHR (R=H or alkyl), and $y$ in the case where it is in ortho-position to the NHR-group stands for H and in the case where it is in ortho-position to the OH-group stands for $SO_3H$, with such primary aromatic amines which contain neither sulfo nor carboxyl groups in presence of water and boric acid.

4. Process for the production of condensation products of the anthraquinone series, consisting in heating the leuco-derivative of hydroxyanthraquinone of the formula

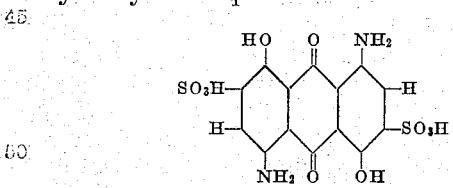

with such primary aromatic amines which contain neither sulfo nor carboxyl groups in presence of water and boric acid.

5. Process for the production of condensation products of the anthraquinone series, consisting in heating the leuco-derivative of hydroxyanthraquinone of the formula

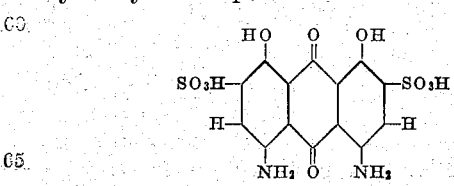

with such primary aromatic amines which contain neither sulfo nor carboxyl groups in presence of water and boric acid.

6. As new products the condensation products of the anthraquinone series of the general formula

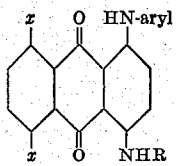

in which the aryl residue may carry substituents of a group of substituents consisting of OH, $NH_2$, alkyl, halogen, $SO_3H$

R stands for alkyl or H, one $x$ stands for OH, and the other $x$ for NHR (R=H or alkyl), and in which three of the $\beta$-positions are occupied by H-atoms and the fourth is occupied by a further H-atom or by an $SO_3H$-group, which products form dark powders which dissolve in alcohol to blue to green-blue solutions, and in concentrated sulfuric acid to yellow to yellow-green solutions, which change to violet to blue-green on addition of boric acid, and which products yield blue to blue-green tints when printed or dyed on acetate silk.

7. As new products the condensation products of the anthraquinone series of the general formula

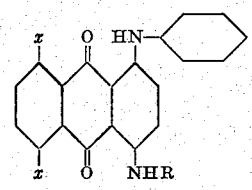

in which the benzene residue may carry substituents of a group of substituents consisting of OH, $NH_2$, alkyl, halogen, $SO_3H$

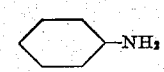

R stands for alkyl or H, one $x$ stands for OH, and the other $x$ for NHR (R=H or alkyl), and in which the four $\beta$-positions are occupied by as many hydrogen atoms, which products form dark powders which dissolve in alcohol to blue to green-blue solutions, and in concentrated sulfuric acid to yellow to yellow-green solutions, which change to violet to blue-green on addition of boric acid, and which products yield blue to blue-green tints when printed or dyed on acetate silk.

8. As new products the condensation products of the anthraquinone series of the general formula

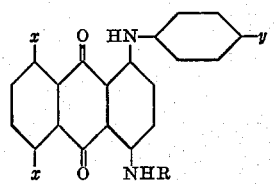

in which $y$ stands for OH or H, R stands for alkyl, one $x$ stands for OH and the other $x$ for NHR (R=H or alkyl), and in which the four $\beta$-positions are occupied by as many hydrogen atoms, which products form dark powders which dissolve in alcohol to green-blue to yellow-green solutions, which change to violet to blue-green on addition of boric acid, and which products yield blue-green tints when printed or dyed on acetate silk.

In witness whereof I have hereunto signed my name this 7th day of December, 1929.

PAUL GROSSMANN.